US005418557A

United States Patent [19]

Pullen

[11] Patent Number: 5,418,557

[45] Date of Patent: May 23, 1995

[54] DROP QUALITY CONTROL SYSTEM FOR JET PRINTING

[75] Inventor: Elaine A. Pullen, Elk Grove Village, Ill.

[73] Assignee: Videojet Systems International, Inc., Niles, Ill.

[21] Appl. No.: 770,597

[22] Filed: Oct. 3, 1991

[51] Int. Cl.[6] .......... G01D 15/18

[52] U.S. Cl. .......... 347/7; 347/84

[58] Field of Search .......... 347/6, 7, 84, 78, 81, 347/85, 17, 19; 137/12

[56] References Cited

U.S. PATENT DOCUMENTS

| | | | |
|---|---|---|---|
| 4,067,020 | 1/1978 | Arway | 347/7 |
| 4,422,085 | 12/1983 | Sumitomo et al. | 347/7 |
| 4,527,170 | 7/1985 | Iwasaki et al. | 347/7 |
| 4,555,712 | 11/1985 | Arway et al. | 347/7 |
| 4,575,735 | 3/1986 | Weinberg | 347/7 |
| 4,628,329 | 12/1986 | Regnault | 347/7 |
| 4,825,228 | 4/1989 | Glöeckler et al. | 347/7 |
| 4,827,278 | 5/1989 | Lecheheb | 347/7 |
| 4,827,280 | 5/1989 | Stamer et al. | 347/6 |
| 4,860,027 | 8/1989 | Ozelis et al. | 347/7 |
| 4,910,529 | 3/1990 | Regnault | 347/6 |

FOREIGN PATENT DOCUMENTS

| | | |
|---|---|---|
| 0123523 | 10/1984 | European Pat. Off. . |
| 56-126170 | 10/1981 | Japan . |
| 8903768 | 10/1988 | WIPO . |

*Primary Examiner*—Robert B. Beatty

*Attorney, Agent, or Firm*—Rockey, Rifkin and Ryther

[57] ABSTRACT

A method and apparatus are disclosed for controlling the flight time and composition of a marking fluid used in a continuous jet marking system. A three-way valve permits switching between fresh ink and system ink supplies. Periodically a comparison of pressure required to maintain a constant drop flight time is made by a controller. Because both supplies are in the same operating environment any difference in pressure is due to a change in system ink viscosity. Solvent is added, if necessary, to the system ink via a pump to restore viscosity to desired values.

11 Claims, 1 Drawing Sheet

DROP QUALITY CONTROL SYSTEM FOR JET PRINTING

BACKGROUND OF THE INVENTION

This invention relates to the field of drop marking systems of the type in which a marking fluid is forced through a nozzle, which converts the liquid into droplets which can then be controlled by various means while projected toward a substrate for marking purposes. Examples of such systems include the familiar ink jet marking systems used for high speed label printing, product identification and the like, although there are other drop marking systems known in the art.

One particular type of system which advantageously employs the present invention is the continuous stream, synchronous ink jet printer. Such a system typically includes an ink reservoir and a remotely located nozzle or printhead connected to the reservoir by a conduit. Ink is forced under pressure from the reservoir to the nozzle which emits a continuous stream of ink drops. The ink, which is electrically conductive, is provided with a charge as the drops leave the nozzle. The drops then pass through a deflection field which causes selected drops to be deflected so that some of the drops are deposited onto a substrate while the remaining drops are returned to the reservoir for reuse.

It is known in the prior art to sense the flow of the ink from the reservoir and adjust ink parameters to maintain a desired flow rate. This teaching is found in the present assignee's prior U.S. Pat. No. 4,555,712. In the '712 patent a method and apparatus are disclosed which provide a means for determining and maintaining ink drop velocity substantially constant in a manner which is substantially more accurate than was obtainable in the prior art.

In a preferred embodiment of the '712 patent the control system adjusts the flow rate by controlling the addition of makeup solvent to the ink reservoir. The viscosity of the ink is thereby adjusted so as to maintain drop velocity substantially constant.

Experience with this system has demonstrated that wide variations in temperature may cause the percentage of solids (dyes and resins) in the ink supply to vary by as much as ten to forty percent from its initial composition while maintaining viscosity and flow rate substantially constant. Such a wide shift in composition affects other characteristics important in an ink jet system, such as ink drying time, drop break off point and even the charging characteristics of the ink drops.

An improvement over the system disclosed in the '712 patent is described in U.S. Pat. No. 4,860,027. The '027 patent teaches a method of compensating for temperature variations so that the marking fluid composition is maintained within acceptable ranges. This is accomplished by measuring temperature changes at selected intervals and determining the flow time differences due to such temperature change. This information is used to alter the referenced flow time employed by the electronic controller in deciding whether to add additional solvent to the marking fluid.

The '027 patent, although accounting for temperature variation to maintain composition within acceptable levels, does not maintain flow time constant under some operating conditions. Specifically, it adjusts the flow time to compensate for perceived changes in operating temperature thereby altering flight time. In some circumstances, this is undesirable, as flight time is also critical to print quality.

It is accordingly an object of the present invention to maintain drop flight time relatively constant while still accounting for temperature variations and changes in the marking fluid composition during extended operation.

SUMMARY OF THE INVENTION

According to the present invention, ink drop velocity and, therefore, drop flight time is maintained substantially constant. This is accomplished by employing a drop velocity detector which causes the controller to adjust flow pressure as necessary. System ink supply is altered by the addition of solvent when required.

A three-way valve is employed so that either fresh ink (ink which has not been cycled through the system) or system ink can be provided to the ink jet nozzle. During set up, fresh ink is supplied and the velocity of the drops ejected from the nozzle is set to the desired velocity for optimal printing results.

After printing operations have commenced using system ink, the controller periodically operates the three-way valve to again employ fresh ink. The system is readjusted to maintain drop velocity constant under current operating conditions, thereby to account for any changes in temperature, nozzle wear and myriad other system variations. The pressure sensor in the fluid line detects fluid pressure. This reading is then stored for comparison.

The valve is then switched back to the system ink supply. Drop velocity for the system ink is brought up to the desired value and a reading from the pressure sensor is compared with the value obtained for the fresh ink supply. Because the velocity and operation temperature is the same in both cases, only changes in viscosity of the system ink are reflected in any detected differences in pressure readings. If solvent is required to adjust viscosity, it is added by means of a solvent pump from a solvent reservoir.

DETAILED DESCRIPTION OF THE PREFERRED EMBODIMENT

Figure 1:
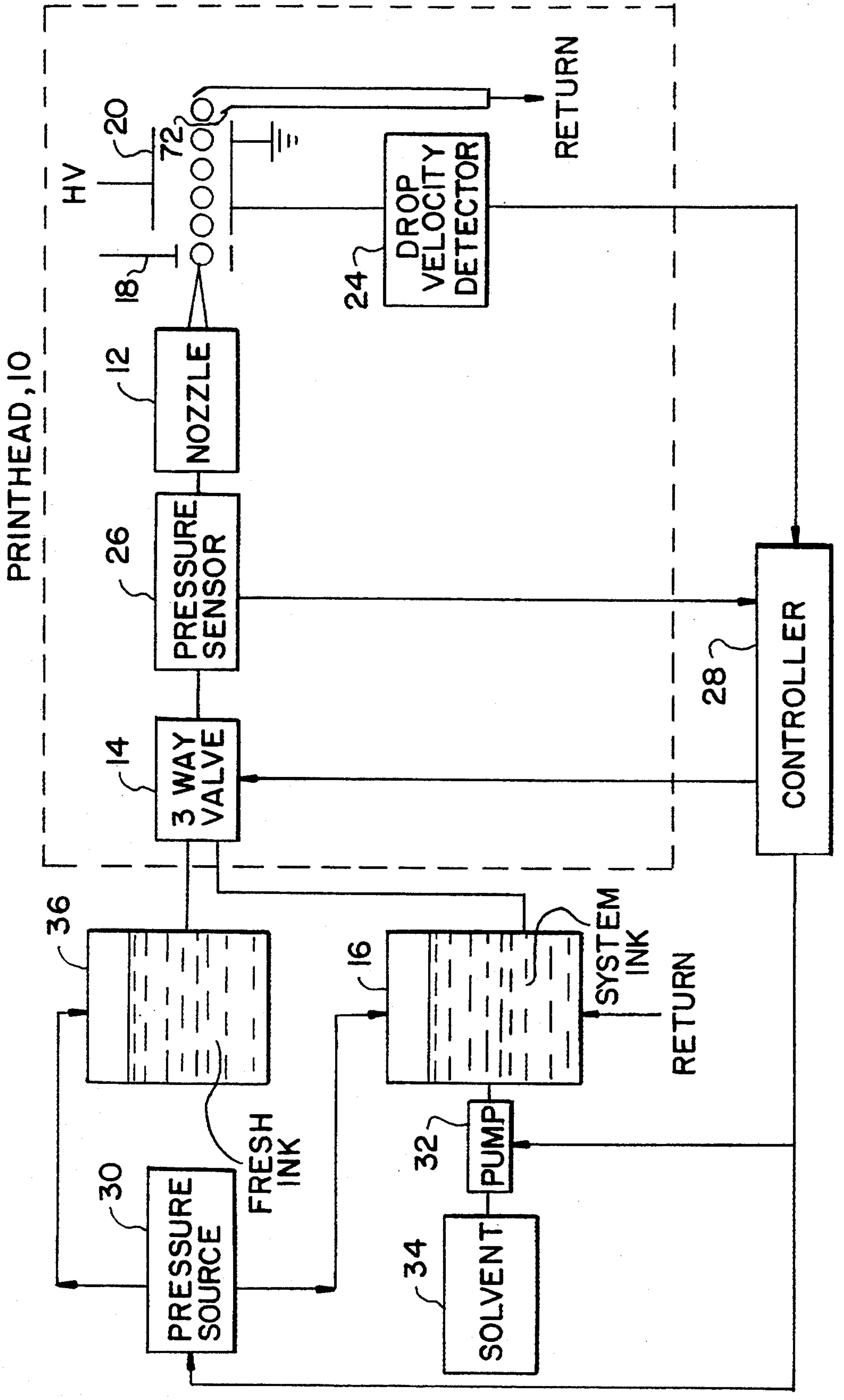
FIG. 1 illustrates a preferred embodiment of the invention.

As indicated in the background portion of the specification, the present invention is an improvement upon prior U.S. Pat. Nos. 4,555,712 and 4,860,027 both of which are hereby incorporated by reference. In these patents it is taught to maintain flow rate of ink from a reservoir to a nozzle relatively constant. In turn, this maintains drop velocity of the drops emitted from the nozzle relatively constant optimizing the quality of the printing accomplished by the device. The '712 patent discloses that flow rate can be maintained constant in a number of ways including adjusting the pressure used to move the ink from the reservoir to the nozzle; adding solvent to alter the viscosity composition of the ink; as well as heating or cooling the ink.

In general, the preferred way of maintaining constant flow rate or flight time is to add "makeup" solvent to the ink supply. This is because ink drops which are not used for marking are returned to the system ink supply for reuse. The solvent component of the ink is volatile and over time evaporation results in a viscosity increase. Other operating conditions often mask this change in viscosity making it difficult to know when and how much solvent to add. For example, temperature increases as the equipment heats up during prolonged use can interfere with systems which simply maintain viscosity constant.

The '027 patent attempted to solve this problem by incorporating a temperature sensor adjacent the nozzle for providing an adjustment to the flow time calculation which would compensate for temperature changes. Although reasonably successful, it is possible to maintain flow rate (and flight time) constant while automatically compensating for temperature according to the present invention without monitoring temperature nor adjusting control parameters as a function of temperature. Furthermore, the present invention maintains the integrity of the ink composition better than the prior art because it employs a dynamic comparison of the flow rate and viscosity of the system ink with the flow rate and viscosity of fresh ink under the identical operating conditions. In this way, look-up tables, ink compensation data, temperature correction factors and the like are eliminated along with the unreliability which necessarily occurs due to real world differences between, for example, the written specifications of a particular ink and the actual characteristics of the shipment being used.

Referring to the Figure, a preferred embodiment of an apparatus for carrying out the invention is illustrated. A printhead 10 includes a nozzle 12 which receives a supply of ink via a three-way valve 14 from a system ink reservoir 16. Ink supplied to the nozzle is formed into a stream of droplets by energy supplied by a piezoelectric device as known in the art. The drops pass a charging electrode 18 where selected drops are electrically charged and then through a high voltage deflection field 20. Drops which have been charged are deflected to a substrate to be marked while uncharged drops are returned to the system ink reservoir 16 via collector 72.

The velocity of the drops in flight is measured by a drop velocity detector 24 associated with the high voltage deflection plates 20. The drop velocity detector is conventional as, for example, of the type described in U.S. Pat. No. 4,417,256 to Filmore.

Disposed in the supply line from the system ink supply 16 to the nozzle 12 is a pressure sensor 26 from which viscosity changes can be determined. The output from the pressure sensor 26 and the drop velocity detector 24 are supplied to a controller 28 of the type described in the '712 and '077 patents. This controller may be a solid state logic system or a programmed microcomputer system. In either case, its function is to properly operate the printing system. It receives inputs from the pressure sensor and the drop velocity detector and operates a three-way valve 14 and a pressure source 30 used to deliver system ink from the reservoir to the nozzle.

Pressure source 30, in the illustrated embodiment, is a source of compressed air. If desired, a fluid pump can be used in place of pressure source 30.

When the system ink supply requires the addition of solvent, a pump 32 adds it to the reservoir 16 from a solvent supply 34. Operation of this pump is under control of the controller 28.

For the purposes to be described hereafter, a fresh ink reservoir 36 is provided and is pressurized in the same way as system ink reservoir 16. The process controller 28, by operating a three-way valve 14, can substitute fresh ink for system ink when it is desired to check system operation. Note, that unused fresh ink is returned to the system ink reservoir 16 not the fresh ink reservoir 36. Thus, the fresh ink reservoir contains only virgin ink from which no evaporation of solvent has taken place.

According to the present invention, the fresh ink reservoir is maintained in substantially the same operating environment as the system ink reservoir. Thus, it will be subject to the same temperature, vibration and other environmental conditions. This is an important aspect of the present invention for it ensures that when a comparison of fresh ink versus system ink is made, as will be described hereafter, any differences detected are due almost exclusively to changes in the system ink composition and not to temperature or other variables. In this way, the need for a temperature sensor and temperature compensation of the viscosity calculations of the type disclosed in the '027 patent are eliminated.

Operation of the system according to the present invention is as follows. Initially, the pressure source 30 is adjusted using fresh ink so that the velocity of drops emitted from nozzle 12 are within predetermined limits which produce the best printing for a given substrate, distance, etc.

Printing is then initiated using ink from the system ink reservoir supplied to the nozzle via the valve 14.

Periodically, it is important to determine the present quality of the system ink. For this purpose, the processor operates valve 14 and switches to the fresh ink reservoir 36. The system is then adjusted until the drop velocity detector 24 indicates that drop velocity is within the desired limits established at the initial set up. At that time, the pressure sensor 26 is also interrogated to determine the pressure necessary to produce the desired drop velocity. This pressure value is compared with the value recorded during normal operation of the printhead using ink from the system ink reservoir 16.

Because velocity is the same and because both ink reservoirs are at substantially the same temperature, any pressure difference between the fresh ink and the system ink reflects a change in viscosity of the system ink from its initial value. Compensation can then be made by adding solvent, if necessary, from reservoir 34 using pump 32.

If the pressure required for the system ink, $P_s$ is greater than the pressure required for fresh ink, $P_f$ than the system ink is more viscous than the fresh ink. If the reverse is true, due to for example, temperature changes in the system during prolonged operation or other causes, than the addition of solvent is withheld. Stated mathematically, the pressure difference $P_d$ is equal to:

$$P_d = P_s - P_f$$

If the difference is positive, solvent is added, if negative, solvent is withheld.

The present invention, because it eliminates temperature variation and drop velocity variation to focus solely on changes in viscosity can produce results not obtainable in the prior art. Furthermore, because the comparison is made between ink that has been used and fresh ink from the same batch or lot, it is possible to customize the ink composition by holding $P_d$ at a constant value other than zero. For example, if it were desired to maintain ink viscosity greater than fresh ink, it is only necessary to instruct the controller to maintain $P_d$ at a desired value greater than zero (constant offset). Alternatively, if $P_d$ is held negative, the system ink viscosity is maintained lower than the viscosity of the fresh ink. This constant offset capability be advantageously used to customize ink characteristics for different printers and printing applications.

While preferred embodiments of the present invention have been illustrated and described, it will be understood by those of ordinary skill in the art that changes and modifications can be made without departing from the invention in its broader aspects. Various features of the present invention are set forth in the following claims.

What is claimed is:

1. A method of regulating ink viscosity while maintaining desired ink drop velocity in a drop marking device, comprising the steps of:

setting the desired drop velocity using only fresh ink;

b. thereafter operating the marking device using ink which is recycled through the marking device and subject to solvent evaporation and temperature variations;

c. determining the fluid pressure, $P_s$, required to maintain the desired drop velocity while using the recycled ink;

d. periodically reverting to the use of fresh ink which is subjected to the same temperature variations as the recycled ink;

e. restoring the drop velocity to the desired value during step d operation;

f. determining the fluid pressure, $P_f$, required to produce the desired drop velocity during step d operation;

determining the pressure difference, $P_d$, where $P_d=P_s-P_f$, h. adding solvent to the recycled ink if $P_d$ is greater than desired.

2. A method of detecting non temperature related changes in ink viscosity while maintaining a desired ink drop velocity in a drop marking device, comprising the steps of:

a. setting the desired drop velocity using only fresh ink;

b. thereafter operating the marking device using ink which is recycled through the marking device and subject to solvent evaporation and temperature variations;

c. determining the fluid pressure, $P_s$, required to maintain the desired drop velocity while using the recycled ink;

d. periodically reverting to the use of fresh ink which is subjected to the same temperature variations as the recycled ink;

e. restoring the drop velocity to the desired value during step d operation;

f. determining the fluid pressure, $P_f$, required to produce the desired drop velocity during step d operation;

g. determining the pressure difference, $P_d$, where $P_d=P_s-P_f$, said difference corresponding to the change in ink viscosity due to factors other than temperature variation.

3. Apparatus for detecting non temperature related changes in ink viscosity in a drop marking device in which an ink stream is forced through a nozzle at a selected velocity by a pressure source to create marking drops comprising:

a) means for detecting ink velocity;

b) means for detecting the fluid pressure of the ink supplied to the nozzle;

c) a first reservoir initially containing fresh ink which is repeatedly cycled through the marking device and returned to such first reservoir and therefore subject to solvent evaporation and temperature variation;

d) a second reservoir containing only fresh ink subject only to temperature variation;

e) means for switching between said first and second reservoirs for supplying ink to the nozzle;

f) means responsive to said velocity detecting means and said pressure detecting means, for periodically calculating:

i) the fluid pressure $P_s$ required to maintain said selected ink velocity while using cycled ink from said first reservoir;

ii) the fluid pressure $P_f$ required to maintain such a selected ink velocity while using fresh ink from said second reservoir;

iii) the pressure difference $P_d=P_s-P_f$, said difference corresponding to the change in ink viscosity due to factors other than temperature variation;

g) said means for periodically calculating including means for operating said switch means to permit periodic detection of the ink velocity and fluid pressure for ink from each of said first and second reservoirs.

4. The apparatus of claim 3 further including: means for adding solvent to said first reservoir, said means for periodically calculating causing operation of said solvent adding means if $P_d$ is greater than zero $\pm$ a constant.

5. The apparatus of claim 3 wherein the means for detecting ink velocity is a drop velocity detector.

6. The apparatus of claim 3 wherein the means for detecting fluid pressure is a pressure sensor in circuit with the ink supply to said nozzle.

7. The apparatus of claim 3 wherein the ink is forced through the nozzle by a pressure source applied to said first and second reservoirs.

8. The apparatus of claim 3 wherein the means for switching between the first and second reservoirs includes a three-way valve, the inputs to the valve connected to each of the reservoirs and the output being supplied to said nozzle.

9. The apparatus of claim 3 wherein said means for periodically calculating is a microprocessor based programmable controller.

10. The apparatus of claim 4 wherein the means for adding solvent includes:

a) a solvent reservoir; and b) a means for injecting solvent into said first reservoir.

11. An apparatus for maintaining the viscosity of ink delivered from a system ink supply to a nozzle to produce droplets comprising in combination:

a supply of fresh ink which is located in proximity to, but segregated from the system ink supply for exposure to common temperature conditions:

means selectively operable for delivering ink from either the system ink supply or said fresh ink supply to the nozzle to produce droplets;

means for sensing the velocity of the droplets means for sensing a first pressure applied to ink delivered from said fresh ink supply to produce a predetermined velocity and a second pressure applied to ink delivered from said system ink supply to produce droplets having said same predetermined velocity; and means responsive to a difference between said first and second pressures to mix a selected quantity of additive with the ink in the system ink supply to maintain substantially constant viscosity of the system ink supply.

* * * * *